(12) United States Patent
Weihrauch

(10) Patent No.: US 6,655,746 B1
(45) Date of Patent: Dec. 2, 2003

(54) PAINT ROLLER AND ITS PRODUCTION PROCESS

(75) Inventor: Georg Weihrauch, Wald-Michelbach (DE)

(73) Assignee: Sterkel GmbH Pinsel-und Frabrollerwerk, Wolpertswende (DE)

( * ) Notice: Subject to any disclaimer, the term of this patent is extended or adjusted under 35 U.S.C. 154(b) by 0 days.

(21) Appl. No.: 09/555,982

(22) PCT Filed: Dec. 11, 1998

(86) PCT No.: PCT/EP98/08078

§ 371 (c)(1),
(2), (4) Date: Jul. 26, 2000

(87) PCT Pub. No.: WO99/30889

PCT Pub. Date: Jun. 24, 1999

(30) Foreign Application Priority Data

Dec. 13, 1997 (DE) .......................... 197 55 533

(51) Int. Cl.⁷ .......................... A46B 15/00; A46D 3/00; B29D 23/00; B29C 45/00; B05C 17/02

(52) U.S. Cl. .......................... 300/21; 264/48; 15/230.11; 15/244.3; 15/230.16; 15/230.17; 29/895.23; 29/895.21; 492/13

(58) Field of Search .......................... 15/230.11, 230, 15/244.3, 244.4, 230.16, 230.17; 492/37, 13, 45, 53, 56, 59; 264/45.5, 48, 138; 29/895.21, 895.23, 895.32; 300/21

(56) References Cited

U.S. PATENT DOCUMENTS 3,922,328 A * 11/1975 Johnson ...................... 264/46.1
4,756,065 A    7/1988 Carlson (List continued on next page.)

FOREIGN PATENT DOCUMENTS

| DE | 16 90 640 | 1/1955 | |
|---|---|---|---|
| DE | 10 08 322 | 10/1957 | |
| DE | 1 960 394 | 1/1971 | |
| DE | 76 04 987 | 8/1976 | |
| DE | 25 38 588 | 3/1977 | |
| DE | 39 02 195 | 8/1990 | |
| DE | 94 02 914 | 3/1995 | |
| EP | 0 765 722 | 4/1997 | |
| GB | 2 141 373 A | * 12/1984 | ............. B29F/1/00 |

OTHER PUBLICATIONS

Database WPI Secion Ch, Week 8840 Derwent Publications Ltd., London, GB; AN 88–278396—XP002900426 & BR 8 700 925 A (Pinceis Tigre SA), Sep. 6, 1998. s. Abstract.

Database WPI Section Ch, Week 9315 Derwent Publications Ltd., London GB; AN 93–124579—XP02900427 & SU 1 729 783 A (Muramansk Ship Building Inst), Apr. 30, 1992 s. Abstract.

Edwards, E.P.B.: Gummiüberzogene Walzen. In: Techn. Rundschau, Nr. 1,1961,S.24–27.

Kleimann, H.: Harter Polyurethan–Integralschaum–stoff. In: Kunststoffberater Oct. 1979, S. 568–571.

Shutov, F.A.: Integral/Structural Polymer Foams Springer–Verlaf, Berlin, u.a., 1996, S.96–104.

Primary Examiner—Terrence R. Till
Assistant Examiner—Laura C. Cole
(74) Attorney, Agent, or Firm—Paul Vincent

(57) ABSTRACT

The invention relates to a method for producing a paint roller having a roller body comprised of a synthetic foam with an inner recess for placement on a support arm. The invention is characterized in that the roller body is expanded in a molding tool. Towards this end, the expansion pressure is set such that a closed compact covering of the synthetic material, preferably a polyester polyurethane foam, is formed on the outer surface of the roller body and/or on the wall of the inner recess. The coating is at least partially opened or removed in a successive method step.

21 Claims, 4 Drawing Sheets

U.S. PATENT DOCUMENTS

| | | |
|---|---|---|
| 4,956,211 A | 9/1990 | Saito |
| 5,025,039 A | 6/1991 | Neuhaus et al. |
| 5,120,385 A | 6/1992 | Takahashi et al. |
| 5,339,484 A * | 8/1994 | Polzin et al. ............ 15/230.11 |
| 5,419,003 A * | 5/1995 | Tollasepp ................ 15/230.11 |
| 5,584,092 A | 12/1996 | Polzin |
| 5,613,265 A * | 3/1997 | Gemmell ................ 15/230.11 |
| 5,875,514 A * | 3/1999 | Friess .................... 15/230.11 |
| 5,980,802 A * | 11/1999 | Wakat et al. ............ 264/219 |
| 6,013,132 A * | 1/2000 | Tramont .................. 118/211 |
| 6,129,870 A * | 10/2000 | Hettinga ................ 264/40.5 |
| 6,142,921 A * | 11/2000 | Wakat ...................... 492/13 |

\* cited by examiner

PAINT ROLLER AND ITS PRODUCTION PROCESS

BACKGROUND OF THE INVENTION

The invention concerns a method for producing a paint roller comprising a roller body made from synthetic foam having an inner cavity for mounting onto a support arm. The invention also concerns an associated paint roller.

A paint roller usually comprises a support arm bent from steel rod or wire or made from synthetic material and having a handle formed at a lower end thereof. A paint roller can be slid onto the upper free end of the support arm such that it is rotatably held thereon.

A conventional paint roller comprises a roller body in which a mounting sleeve is disposed consisting of one or more parts and in engagement with the support arm. For producing a conventional paint roller, a relatively large block of soft polyester polyurethane foam is produced using the so-called block foaming method. Due to their sufficiently high chemical resistance, such polyester PUR foams are also suitable for paint rollers which are conventionally also used for processing substances containing solvents and in particular paints. Moreover, polyester PUR foams are very stable in shape and do not swell. The shape of the paint roller is mechanically worked out from the block consisting of the polyester PUR foam by punching, cutting, or milling. Subsequently, the inner cavity is drilled and the end of the paint roller opposite to the insertion end for the support arm is milled round. The mounting sleeve is then introduced into the inner cavity and glued therein. This production method is very demanding and therefore expensive due to the plurality of working steps. Fashioning the paint roller from the block and round milling the end also results in material losses of up to 30% which is both uneconomical and not ecologically beneficial.

DE-AS 1 960 394 discloses production of a paint application roller made from foam, e.g. polyurethane, by introducing two synthetic components into a cylindrical plush or flocked covering serving as a mold. The two components react with one another therein, expand and completely fill the covering. This, however, does not produce a defined circular cylindrical shape for the paint application roller due to local variations in the elasticity of the plush or flocked covering, as a result of which the paint application roller is not round during use which has disadvantageous effects on the application of paint.

So-called integral foams are also known in the art which form, during foaming, a stable closed covering layer on the outer side. This covering layer stabilizes the foamed body. However, due to its smooth surface structure, it is not suitable for the application of paint.

It is the underlying object of the invention to create a method for producing a paint roller which is economically and ecologically beneficial which facilitates good paint application. The invention is also directed to an associated paint roller.

SUMMARY OF THE INVENTION

This object is achieved in accordance with the method claimed. The roller body is thereby foamed in a shaping tool. In this fashion, the paint roller is already given the desired shape during the foaming process such that no or only very little finishing work is necessary and no material is lost.

Additionally, the method parameters, e.g. the tool temperature, cooling, foam density, foaming pressure etc. which can be controlled by the composition of the synthetic material are set such that a closed compact skin of synthetic material is formed on the outer surface of the roller body and/or the inner cavity wall. This ensures high shape stability for the paint roller without special further structural components and also produces a continuous, smooth surface structure on the outer surface of the roller body which is advantageous e.g. for pressure rollers or other rollers which are subsequently provided with a coating or sleeve-like decorative elements or with plush or flock-coated cylindrical rollers or rings. Moreover, the covering reduces the influence of humidity and solvents on the synthetic foam and stabilizes the roller body during use when pressure is applied from one side during a rolling motion. To permit use of the paint roller for direct paint application, the covering formed on the outer surface of the roller body can be opened or removed completely or partially in a subsequent method step e.g. by cutting, grinding, peeling, sandblasting or etching.

A polyester PUR foam is preferably used as the material for the roller body prior to mold-foaming thereof. Other materials are also feasible which have high chemical resistance and, in particular, solvent resistance. These alternative materials can be e.g. further PUR foams, a pure polyolefine, polyimide or polyester foam.

Paint rollers in accordance with the invention can also be provided with a mounting sleeve in the inner cavity of the roller body which engages the support arm. The mounting sleeve, which preferably consists of synthetic material, can be manufactured independently of the roller body and can subsequently be inserted and fixed in the inner cavity thereof, wherein, to prevent bonding, protruding engagement members may be formed on the mounting sleeve which engage in the inner cavity wall of the roller body to thereby hold the sleeve in positive engagement. In particular, teeth or barbs protruding from the outer side, have turned out to be useful as engagement members.

Alternatively, the paint roller can also be produced by initially introducing the mounting sleeve into the shaping tool and then surrounding or foaming over the roller body in a subsequent method step. The mounting sleeve can be separately pre-fabricated. Preferably, however, it is first injected into the shaping tool using a multiple component procedure. Such inline production can considerably reduce the production costs of a paint roller.

The paint roller produced in accordance with the inventive method can be made with relatively low weight to improve ease of use.

In a preferred embodiment of the invention, at least one undercut is formed in the inner cavity of the roller body. This permits latching or resilient tabs, formed on the support arm, to spring out into the inner cavity and engage in the undercut to thereby keep the paint roller on the support arm. If the compact synthetic material skin formed on the inner cavity wall has sufficient stability, one can optionally omit the mounting sleeve. Alternatively, a mounting sleeve can be provided for stabilization which is undercut by the resilient tabs of the support arm.

The inventive method facilitates straightforward production of an undercut in the inner cavity, since the core of the shaping tool forming the undercut can be removed by elastically deforming the foam material of the roller body.

The roller body can be provided with a structured outer surface. This can be achieved in a simple fashion in accordance with the invention if the inner wall of the shaping tool has a corresponding structure. Alternatively or additionally, subsequent surface treatment is possible.

Paint rollers are conventionally used to support an outer covering having e.g. lamb fleece, plush or other materials. Other types of coverings are also feasible. In accordance with the invention, a covering can be mounted to the outer surface of the roller body by inserting the covering into the shaping tool before foaming the roller body. A separating agent can thereby be provided between the covering and the roller body which permits subsequent removal of the covering.

Since formation of openings or undercuts on the outer surface of the roller body is easy with the inventive method, same can also be used for positive and/or non-positive engagement of a subsequently applied jacket or covering. In a preferred embodiment, the paint roller has a groove on the end face of the roller body having the insert opening for the inner cavity, into which the ends of a covering can be folded for positive and/or non-positive engagement. The groove is preferably annular and surrounds the insert opening.

Optionally, the coating can also be fixed in positive and/or non-positive engagement in an opening formed in the opposite end, facing away from the insert opening.

With respect to the paint roller, the invention provides a closed, compact skin of the synthetic material, formed on sections of the outer surface of the roller body and/or the inner cavity wall to provide the paint roller with the required stability. Further features of the paint roller can be extracted from the previous description of the method.

BRIEF DESCRIPTION OF THE DRAWING

Further details of the invention can be extracted from the following description of embodiments with reference to the drawing.

DESCRIPTION OF THE PREFERRED EMBODIMENT

Figure 1:
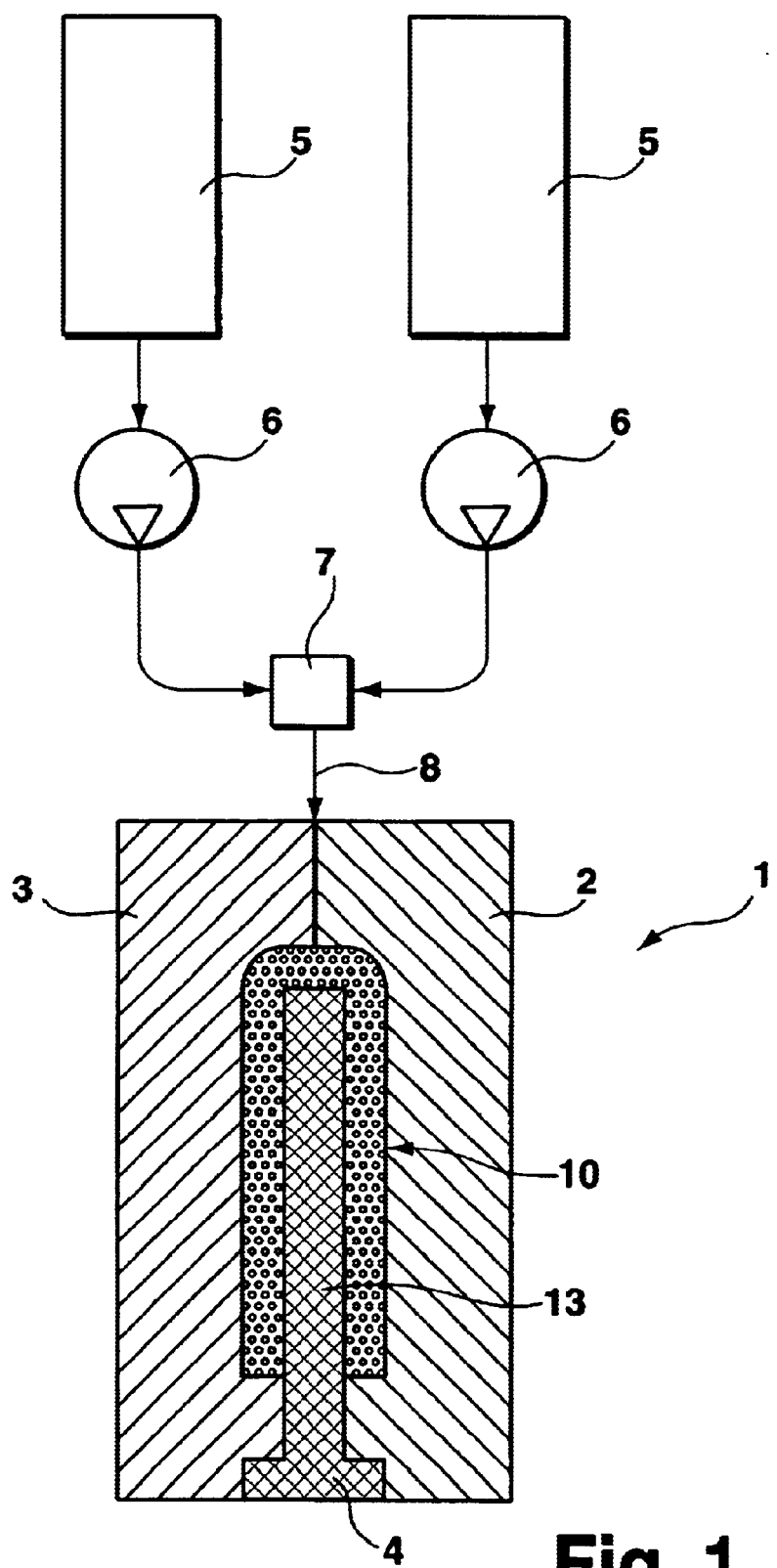
FIG. 1 shows a schematic illustration of a system for carrying out the method in accordance with the invention.
Figure 2:
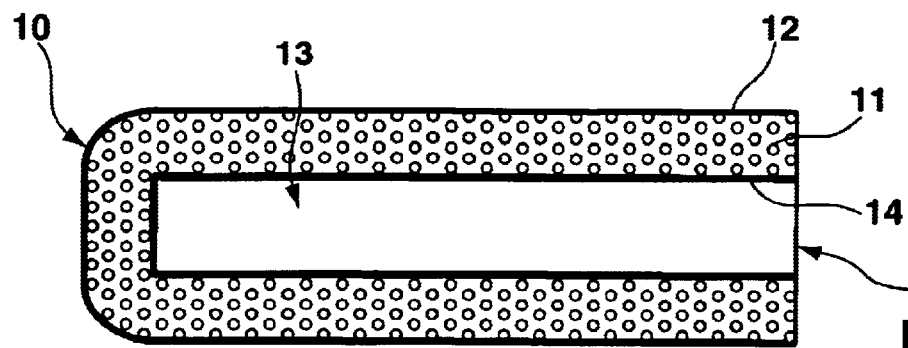
FIG. 2 shows a longitudinal section through a paint roller.

FIG. 1 shows a system for producing a paint roller 10 in accordance with the inventive method. The system comprises a shaping tool 1 with two mold halves 2 and 3 forming the outside of the paint roller 10 and a shaping core 4 defining an inner cavity 13 of the paint roller 10. Two supply containers 5 are schematically provided for different material components each of which can be supplied, via a supplying and dosage aggregate 6, to a mixing device 7 from which the material is inserted into the mold cavity of the shaping tool 1 via a schematically indicated supply line 8. The material, which is preferably a polyester PUR material, is foamed therein for forming the shaping roller 10. After opening the mold halves 2 and 3 and removing the mold core 4, one obtains the paint roller 10 as shown in FIG. 2. It comprises an essentially cylindrical roller body 11 which is closed at its front end and rounded at the outer side. The inner cavity 13, formed by the mold core 4, is accessible in a manner known per se via a insert opening 15, opposite to the rounded end, by means of which the paint roller can be slid onto a support arm.

Figure 3:
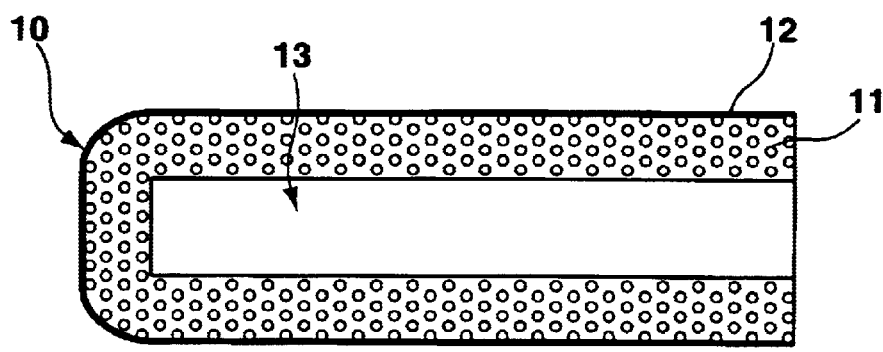
FIG. 3 shows the paint roller in accordance with FIG. 2 after finishing.
Figure 4:
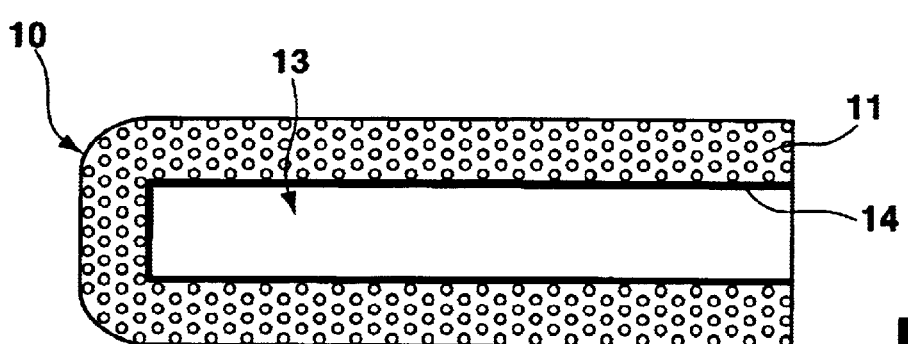
FIG. 4 shows the paint roller in accordance with FIG. 2 after finishing.

The foaming pressure of the synthetic material forms a closed compact skin 12 or 14 of synthetic material on the outer surface of the roller body 11 and also on the inner cavity 13 wall. Sections of these skins 12 and 14 can be mechanically opened or removed in a subsequent working step. FIG. 3 shows a paint roller 10, wherein the skin 14 on the inner cavity 13 wall has been removed. In the paint roller in accordance with FIG. 4, only the skin 12 on the surface of the roller body 11 has been removed.

Figure 5:
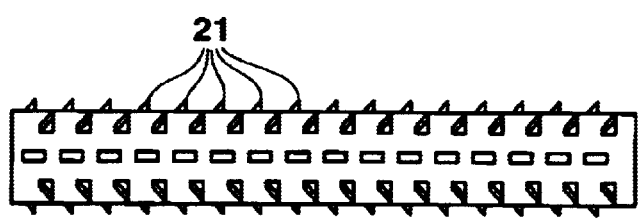
FIG. 5 shows a side view of a mounting sleeve.
Figure 6:
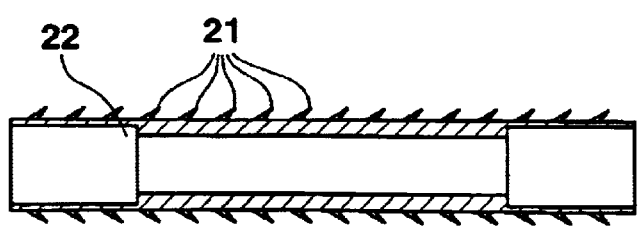
FIG. 6 shows a longitudinal section through the mounting sleeve in accordance with FIG. 5.
Figure 7:
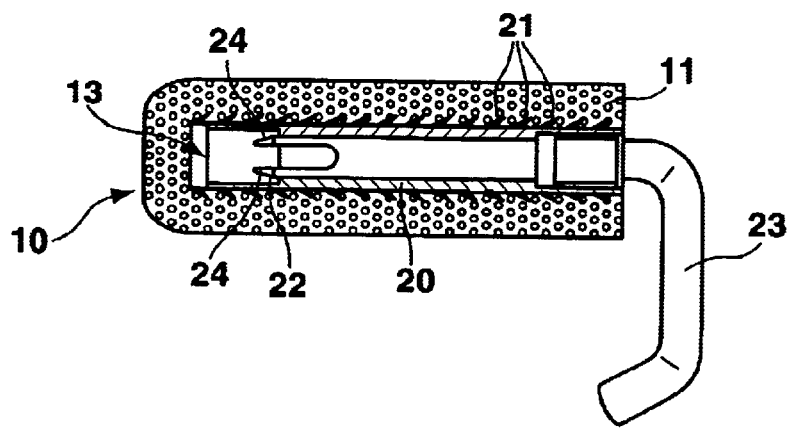
FIG. 7 shows a paint roller mounted to a support arm.

A mounting sleeve 20 can be introduced into the inner cavity 13 of the paint roller 10, as shown in FIGS. 5 and 6. The mounting sleeve 20 comprises, on its outer surface, a plurality of barb-like protruding teeth 21 which engage, during insertion into the inner cavity 13, into the inner cavity wall or into the covering formed therein to thereby hold the mounting sleeve 20 in the roller body 11 in positive engagement (see FIG. 7). A step or undercut 22 is formed in the inside of the mounting sleeve 20. This permits resilient tongues 24, formed at the free end of a support arm 23 (FIG. 7), to engage behind the step 22 during insertion into the mounting sleeve to hold the paint roller 10 on the support arm 23.

Figure 8:
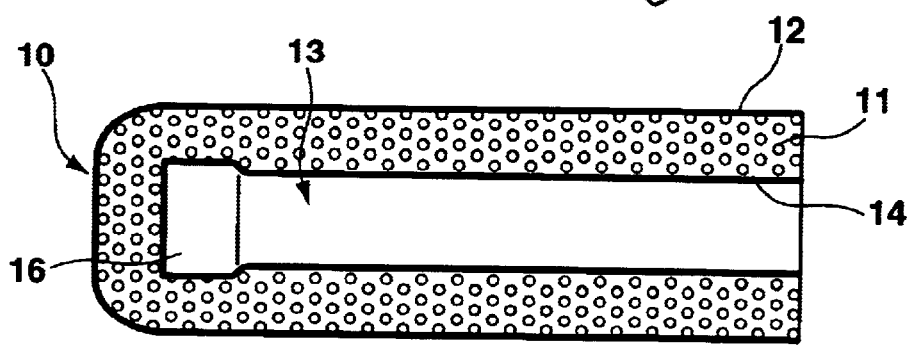
FIG. 8 shows a paint roller in a modified embodiment.

FIG. 8 shows an alternative embodiment of the paint roller 10 which differs from the design described above in that an undercut 16 is formed proximate the floor of the inner cavity 13 which also serves for spreading of the support arm 23 resilient tongues 24 during mounting of the paint roller 10. If the skin 14 on the inner cavity 13 wall is sufficiently stable, a mounting sleeve can be omitted. Alternatively, a pipe-like mounting sleeve can be inserted into the inner cavity behind which the resilient tongues 24 then engage.

Figure 9:
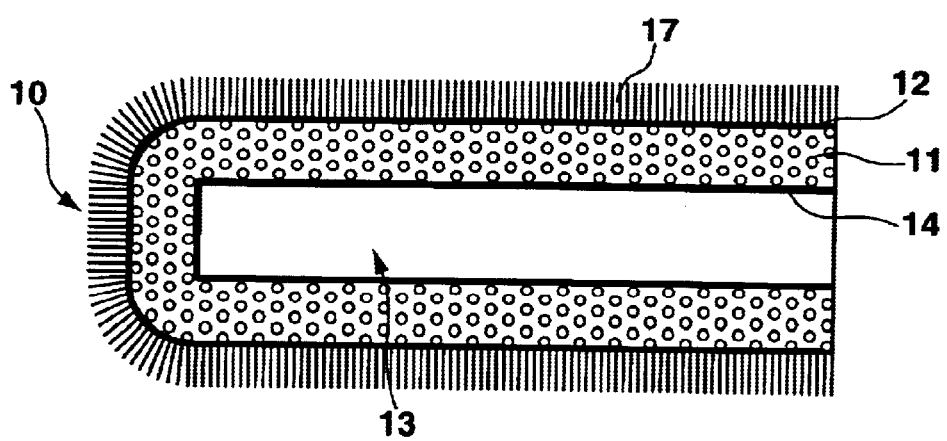
FIG. 9 shows a paint roller with outer covering.

In the embodiment shown in FIG. 9, the outer surface of the paint roller 10 is provided with a covering 17 which is either applied subsequently or already inserted into the shaping tool before foaming of the roller body 11.

Figure 10:
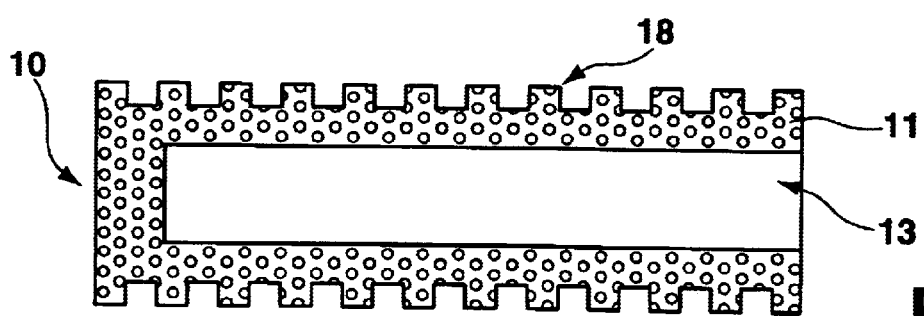
FIG. 10 shows a paint roller with outer structure.

Appropriate structure of the inner wall of the mold halves 2 and 3 allows formation of a structure 18 on the outer surface of the roller body as shown in FIG. 10.

Figure 11:
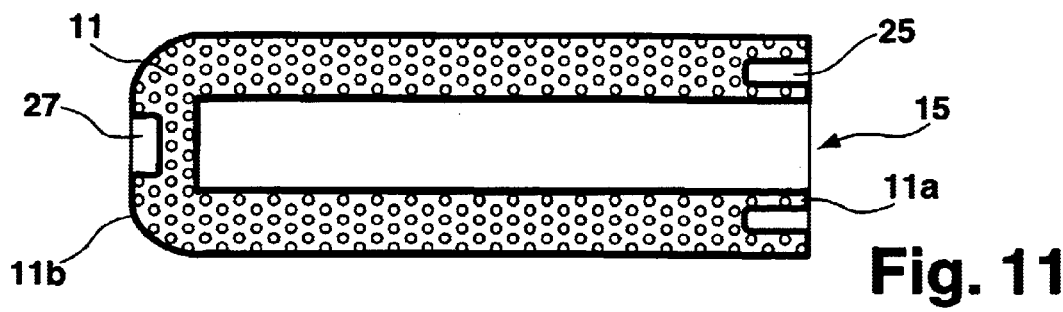
FIG. 11 shows a paint roller for receiving a covering.
Figure 12:
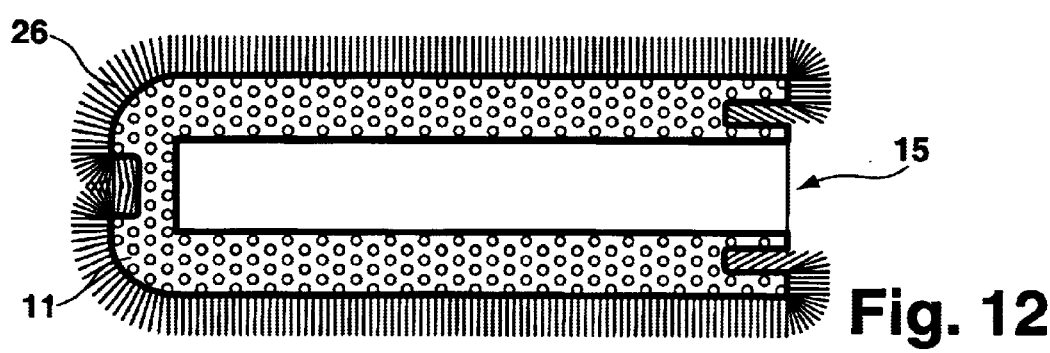
FIG. 12 shows the paint roller in accordance with FIG. 12 with applied cover.

The embodiment of a paint roller shown in FIG. 11 utilizes the possibility of forming a structure during a shaping or foaming process for defining the position of a subsequently mounted covering. FIG. 11 shows that a central depression 27 is formed on the front rounded end face 11b of the roller body 11, whereas an annular opening 25 is formed on the rear end side 11a having the insert opening 15. A covering 26 which may be e.g. a plush skin is pressed or folded at its rear free ends into the annular groove 25 and is pressed into the depression 27 at its opposite end, as shown in FIG. 12. The annular groove 25 and the depression 27 thereby maintain the coating 26 on the roller body 11 in positive engagement.

Figure 13:
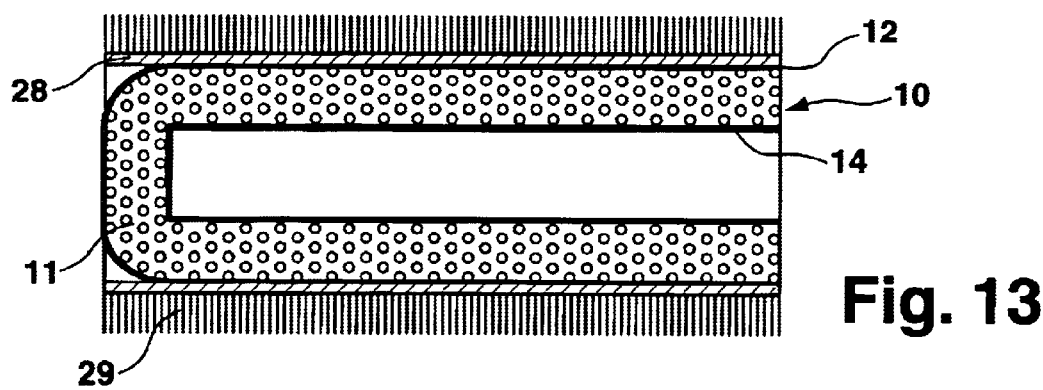
FIG. 13 shows a paint roller with applied cover sleeve.

Instead of mounting a flexible cover onto the paint roller, an intrinsically stable covering sleeve 28 can also be mounted on the paint roller 10 as shown in FIG. 13. The covering sleeve 28 has a cylindrical shape and comprises a plush or flocked covering 29 at its outer side. The elasticity of the roller body 11 facilitates holding of the coating sleeve 28 on the roller body 11 in positive engagement thereby elastically deforming the foam material, wherein the coverings 12, 14 increase the stability of the roller body 11.

Figure 14:
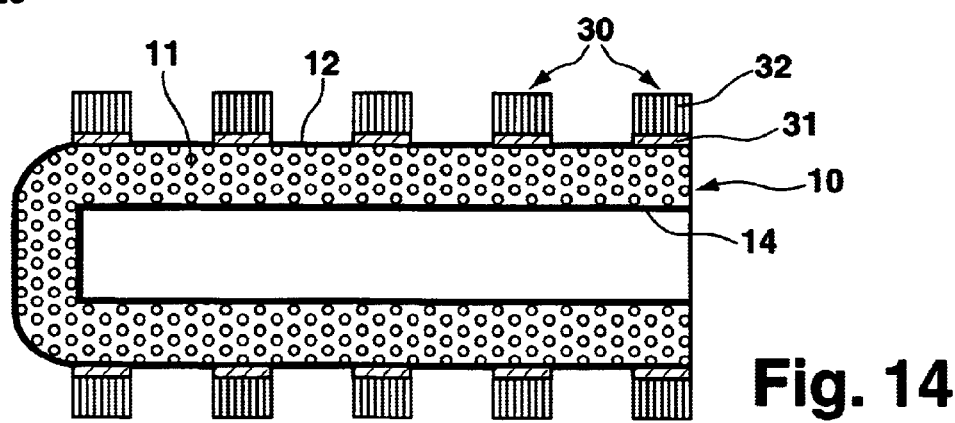
FIG. 14 shows a paint roller with applied cover rings.

In the embodiment shown in FIG. 13, the covering sleeve 28 covers the entire paint roller 10. However, the embodiment shown in FIG. 14 illustrates several cover rings 30 each comprising a carrying sleeve 31 and a plush or flocked covering 32. The cover rings 30 are also held on the roller body 11 in positive engagement.

I claim:

1. A method for producing a paint roller having a roller body made from synthetic foam, the roller foam body having an inner cavity for mounting on a support arm, the method comprising the steps of:

a) injecting a synthetic foam material into a mold cavity of a shaping tool such that said synthetic foam material first substantially expands after entry into said mold cavity;

b) controlling at least one of processing parameters, a tool temperature, a foam density, a foaming pressure, and a cooling to form a closed compact skin of synthetic material on at least one of an outer surface and an inner cavity wall of the roller body; and c) at least one of removing and opening at least a portion of said skin on at least said outer surface following step b).

2. The method of claim 1, wherein said synthetic foam is a polyester PUR foam.

3. The method of claim 1, further comprising disposing a mounting sleeve in the inner cavity.

4. The method of claim 3, wherein said mounting sleeve comprises protruding engagement elements formed thereon which positively engage said inner cavity wall of the roller body.

5. The method of claim 3, wherein said mounting sleeve is inserted and fixed in the inner cavity of the roller body following step b).

6. The method of claim 3, wherein said mounting sleeve is inserted into said shaping tool prior to step a) and is surrounded by said synthetic foam for the roller body.

7. The method of claim 6, wherein said mounting sleeve comprises a thermoplastic material injected into said shaping tool prior to step b), using a multiple component method.

8. The method of claim 1, wherein the inner cavity has at least one undercut.

9. The method of claim 8, wherein said undercut is distorted by elastically deforming the roller body.

10. The method of claim 1, wherein the roller body has a structured outer surface.

11. The method of claim 1, further comprising disposing a cover on said outer surface of the roller body.

12. The method of claim 11, wherein said cover is inserted into said shaping tool prior to step a).

13. A paint roller produced by the method of claim 1.

14. The paint roller of claim 13, further comprising a mounting sleeve disposed in said inner cavity.

15. A paint roller of claim 14, wherein said mounting sleeve comprises protruding engagement elements formed thereon which positively engage in said inner cavity wall.

16. The paint roller of claim 13, wherein said inner cavity has at least one undercut.

17. The paint roller of claim 13, wherein said outer surface is structured.

18. The paint roller of claim 13, further comprising a cover disposed on said outer surface.

19. The paint roller of claim 18, wherein a first end face of said foam body defines an insert opening for said inner cavity as well as a groove for holding said cover.

20. The paint roller of claim 19, wherein said groove surrounds said insert opening.

21. The paint roller of claim 19, wherein a second end face of said foam body, opposite said first end face, has a depression for holding said cover.

* * * * *